(12) United States Patent
Lee

(10) Patent No.: US 11,942,743 B2
(45) Date of Patent: Mar. 26, 2024

(54) POSITION ADJUSTABLE RECEPTACLE WITHIN AN ELECTRONIC DEVICE

(71) Applicant: Samsung Electronics Co., Ltd., Suwon-si (KR)

(72) Inventor: Byungmin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 305 days.

(21) Appl. No.: 17/250,967

(22) PCT Filed: Oct. 1, 2019

(86) PCT No.: PCT/KR2019/012821
§ 371 (c)(1),
(2) Date: Apr. 2, 2021

(87) PCT Pub. No.: WO2020/071730
PCT Pub. Date: Apr. 9, 2020

(65) Prior Publication Data
US 2021/0384688 A1 Dec. 9, 2021

(30) Foreign Application Priority Data
Oct. 4, 2018 (KR) .......................... 10-2018-0118126

(51) Int. Cl.
*H01R 41/00* (2006.01)
*G06F 1/16* (2006.01)
(Continued)

(52) U.S. Cl.
CPC ........... *H01R 41/00* (2013.01); *G06F 1/1656* (2013.01); *H01R 31/06* (2013.01); *H01R 12/714* (2013.01); *H01R 2201/06* (2013.01)

(58) Field of Classification Search
CPC ...... H01R 12/714; H01R 31/06; H01R 41/00; H01R 2201/06; G06F 1/1656; G06F 1/1615
See application file for complete search history.

(56) References Cited

U.S. PATENT DOCUMENTS 6,561,824 B1 * 5/2003 Beckham ............... H01R 31/06
439/131
6,567,273 B1 * 5/2003 Liu ....................... H05K 5/0265
361/752

(Continued)

FOREIGN PATENT DOCUMENTS

JP    2013-048073 A    3/2013
JP    2015-046240 A    3/2015
(Continued)

OTHER PUBLICATIONS

International Search Report and Written Opinion of the International Searching Authority in connection with International Application No. PCT/KR2019/012821 dated Jan. 17, 2020, 10 pages.
(Continued)

*Primary Examiner* — Vanessa Girardi

(57) ABSTRACT

The present invention may comprise: a body including a first plate facing a first direction, a second plate facing a second direction opposite to the first direction, and at least one printed circuit board; and at least one receptacle disposed at the body to be connected to an external connector, wherein the receptacle comprises: a receptacle body which is connected onto the printed circuit board; a receptacle shell to which the external connector is connected and which is slidable in the receptacle body in a third direction vertically facing each of the first and second directions; a guide device which guides the sliding movement of the receptacle shell; a molded member which is coupled to the receptacle shell and configures a connection position of the external con-
(Continued)

nector; and a connection structure which electrically connects the receptacle shell and the receptacle body.

15 Claims, 18 Drawing Sheets

(51) Int. Cl.
  *H01R 31/06* (2006.01)
  *H01R 12/71* (2011.01)

(56) References Cited

U.S. PATENT DOCUMENTS

| | | | | |
|---|---|---|---|---|
| 8,323,040 | B2* | 12/2012 | Prest | H01R 13/44 439/165 |
| 8,835,758 | B2* | 9/2014 | Li | H05K 5/0278 439/535 |
| 8,944,853 | B2* | 2/2015 | Liao | H01R 13/4538 439/660 |
| 9,418,036 | B2* | 8/2016 | Xiao | G06K 19/07732 |
| 9,532,135 | B2 | 12/2016 | Takeda et al. | |
| D820,264 | S | 6/2018 | Lai et al. | |
| 2013/0295796 | A1 | 11/2013 | Kato et al. | |
| 2015/0064958 | A1 | 3/2015 | Katayanagi | |
| 2015/0098184 | A1* | 4/2015 | Tsai | G06F 1/1632 361/679.56 |
| 2017/0208697 | A1 | 7/2017 | Kurian et al. | |

FOREIGN PATENT DOCUMENTS

| | | |
|---|---|---|
| KR | 10-2005-0020425 A | 3/2005 |
| KR | 10-2011-0065800 A | 6/2011 |
| KR | 10-2017-0104852 A | 9/2017 |

OTHER PUBLICATIONS

Notice of Preliminary Rejection dated May 31, 2023, in connection with Korean Application No. 10-2018-0118126, 16 pages.

Office Action dated Dec. 21, 2023, in connection with Korean Patent Application No. 10-2018-0118126, 6 pages.

* cited by examiner

POSITION ADJUSTABLE RECEPTACLE WITHIN AN ELECTRONIC DEVICE

CROSS-REFERENCE TO RELATED APPLICATIONS

This application is a 371 National Stage of International Application No. PCT/KR2019/012821, filed Oct. 1, 2019, which claims priority to Korean Patent Application No. 10-2018-0118126, filed Oct. 4, 2018, the disclosures of which are herein incorporated by reference in their entirety.

BACKGROUND

1. Field

Various embodiments relate to a receptacle and an electronic device including the same.

2. Description of Related Art

An electronic device may include at least one connector disposed on the side surface thereof in order to be electrically connected to an external connector. The connector disposed on the side surface may include, for example, at least one receptacle or a USB.

This connector is physically fixed to a printed circuit board in the main body of the electronic device, and respective functional modules may be stacked in order to implement a slim product.

SUMMARY

However, when functional modules are mounted by being stacked up in an electronic device, due to manufacturing tolerances or design/assembly tolerances, workability/assemblability, or yield may be degraded, causing, for example, a condition in which it is impossible to connect the connector with a connector on a counterpart controller board.

In particular, since various types of ports are arranged in a limited space in the main body of an electronic device, when connecting substantially multiple connectors arranged in the main body with external connectors (e.g., a USB connector and an HDMI), it becomes difficult to simultaneously use the connectors due to interference therebetween.

IT devices and peripheral devices support various connection ports in the form of receptacles or plugs for inter-device connection. For example, when it is desired to connect a USB memory a video stored therein and to play the video using an HDMI port next thereto, users may frequently experience the case in which simultaneous use is impossible due to physical interference between plugs.

Solution to Problem

Various embodiments of the disclosure provide an electronic device including a receptacle constituted with two components such as a receptacle body and a receptacle shell, in which a sliding structure is applied so as to allow the receptacle shell to move left and right so that, when physical interference occurs, the receptacle shell can be moved to a free direction to avoid the physical interference and to allow simultaneous connection, thereby improving a user's convenience and usability and saving a layout space.

According to various embodiments of the disclosure, an electronic device may include: a main body including a first plate oriented in a first direction, a second plate oriented in a second direction opposite to the first direction, and at least one printed circuit board; and at least one receptacle arranged in the main body to be connected with an external connector. The receptacle may include: a receptacle body connected to the printed circuit board; a receptacle shell to which the external connector is connected by moving in the first direction, the receptacle shell being configured to be capable of sliding in a third direction perpendicular to each of the first and second directions in the receptacle body; a guide device configured to guide sliding movement of the receptacle shell; a molded object coupled to the receptacle shell to define a connection position of the external connector; and a connection structure configured to electrically connect the receptacle cell and the receptacle body to each other.

According to various embodiments of the disclosure, an electronic device may include: a receptacle body; a receptacle shell configured to be capable of sliding in the receptacle body in a direction perpendicular to a direction in which an external connector is attached/detached; a guide opening extending in the sliding direction in the receptacle body; a guide rail extending in the sliding direction in the receptacle shell, and configured to move in the guide opening; a molded object coupled to the receptacle shell to define a connection position of the external connector; and a connection structure configured to electrically connect the receptacle cell and the receptacle body to each other.

According to the disclosure, in an electronic device having a narrow receptacle structure (a port structure), it is possible to simultaneously connect external connectors, each having a wider width compared to the conventional ones, in the same layout space.

DETAILED DESCRIPTION

Figure 1:
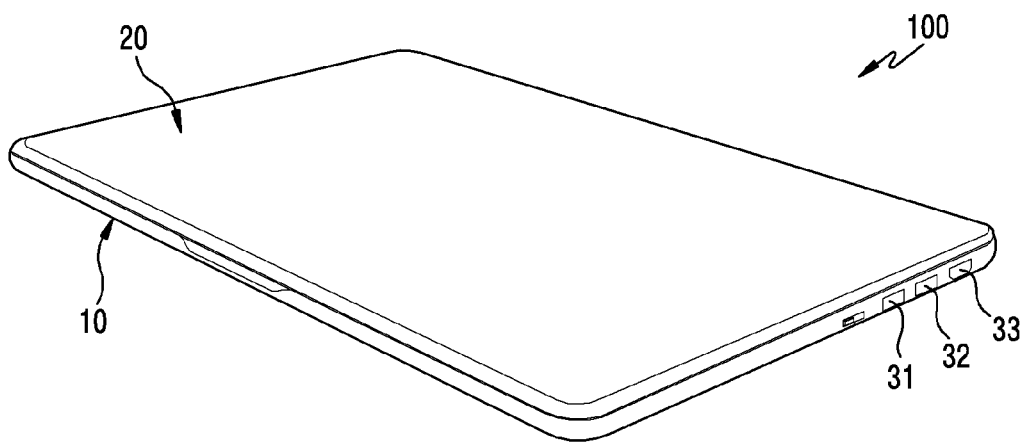
FIG. 1 is a perspective view illustrating an example of an electronic device in a folded state according embodiments of the present disclosure.

Hereinafter, various embodiments of the disclosure will be described with reference to the accompanying drawings. However, it shall be understood that it is not intended to limit the disclosure to specific embodiments, and that the disclosure includes various modifications, equivalents, and/or alternatives of embodiments of the disclosure. In connection with the description of drawings, similar components may be denoted by similar reference numerals.

Figure 2:
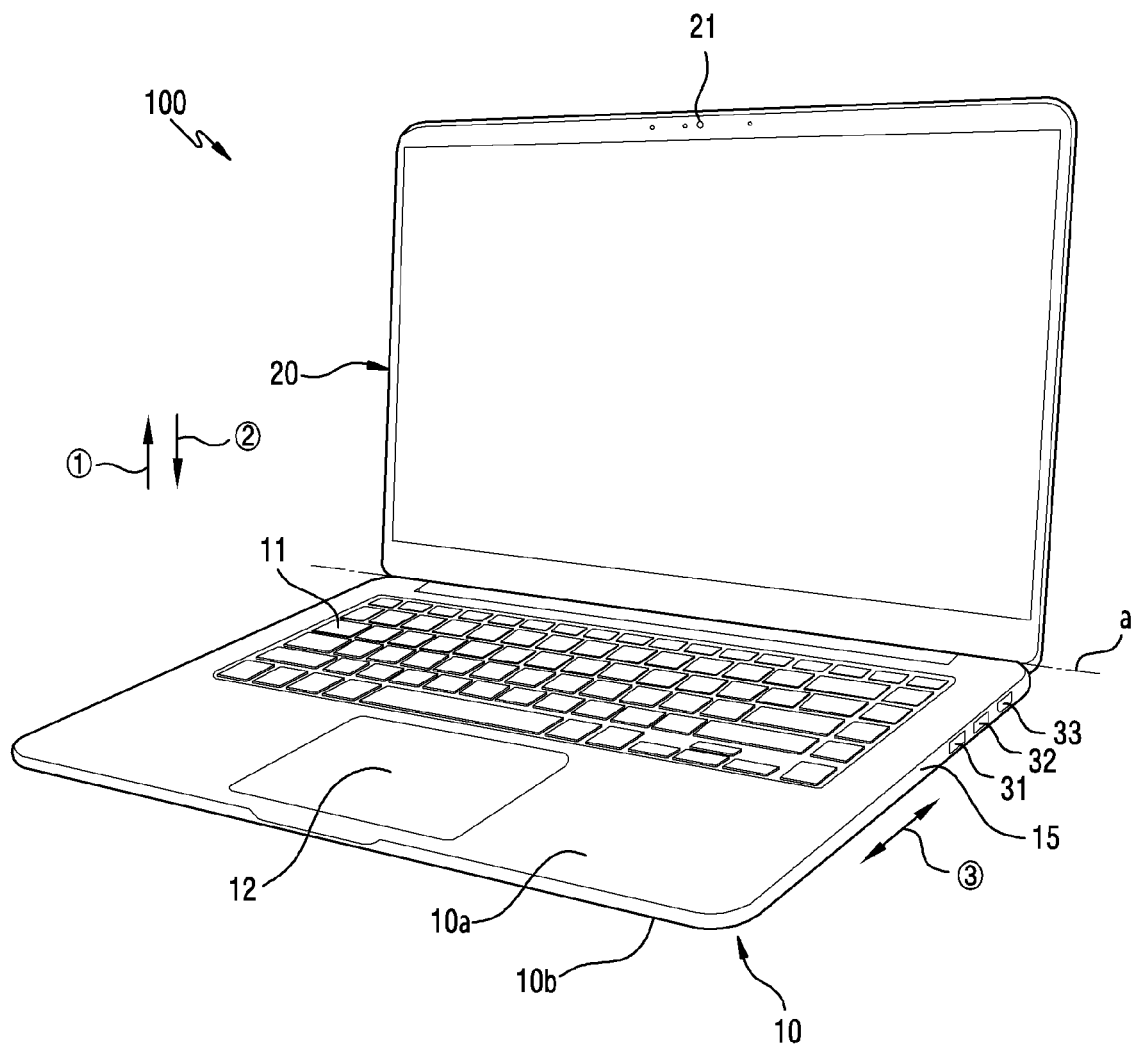
FIG. 2 is a perspective view illustrating an example electronic device in which a display is rotated about 100 degrees according to embodiments of the present disclosure.
Figure 3:
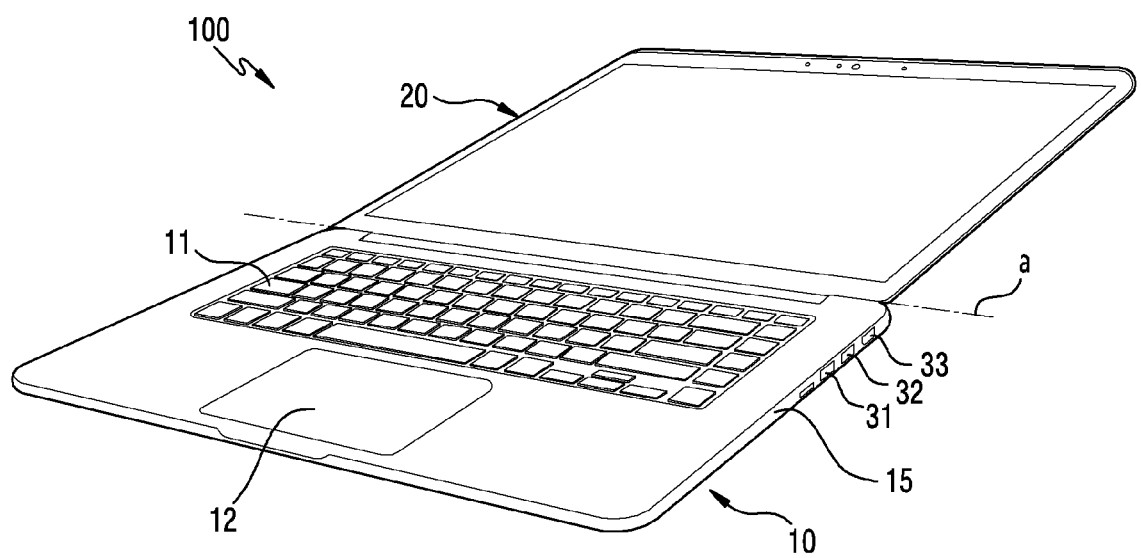
FIG. 3 is a perspective view illustrating an example electronic device in an unfolded state according to embodiments of the present disclosure.

FIG. 1 is a perspective view illustrating an electronic device according to various embodiments in a folded state. FIG. 2 is a perspective view illustrating an electronic device in which a display is rotated about 100 degrees according to various embodiments. FIG. 3 is a perspective view illustrating an electronic device according to various embodiments in an unfolded state.

Referring to FIGS. 1 to 3, an electronic device 100 according to various embodiments may include at least one of, for example, a smartphone, a tablet personal computer (PC), a mobile phone, an image phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device (e.g., smart eyeglasses, a head-mounted-device (HMD), an electronic cloth, an electronic bracelet, an electronic necklace, an electronic appcessory, an electronic tattoo, a smart mirror, or a smart watch).

The electronic device 100 according to various embodiments may include a main body 10 and a display 20. In the main body 10, the display 20 is capable of being folded or unfolded around a hinge axis a. For example, on the top surface 10a of the main body 10, a plurality of keys 11 (e.g., a keyboard) and a touch pad 12 are arranged, and a camera, a speaker 21, a microphone, and the like are arranged on the display 20.

According to an embodiment, the main body 10 may include a first plate oriented in a first direction ① and a second plate oriented in a second direction ② opposite to the first direction ①. For example, the first plate may be the top surface 10a of the main body, and the second plate may include a back cover 10b. According to an embodiment, at least a portion of the space between the first and second plates may be surrounded by the side surface 15. The side surface 15 may include multiple receptacles 31, 32, and 33. Respective receptacles 31, 32, and 33 may be arranged at intervals in a direction in which the side surface 15 extends, for example, a third direction ③. The receptacles 31, 32, and 33 may be connectors for electrically connecting external connectors to the main body 10. For example, the external connectors may include a USB connector and a male type receptacle.

Hereinafter, a structure of a receptacle mounted on the side surface of the main body 10 according to various embodiments will be described with reference to the accompanying drawings.

Figure 4A:
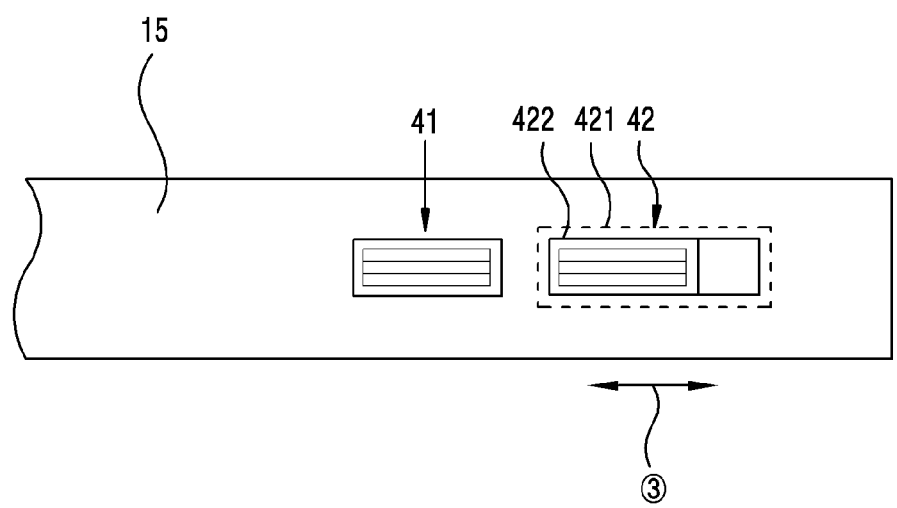
FIG. 4A is a front view illustrating an example of two receptacles arranged on the side surface of an electronic device in which one of the receptacles is a fixed receptacle and the other is a movable receptacle according to embodiments of the present disclosure.

FIG. 4A is a front view illustrating two receptacles arranged on the side surface of an electronic device according to various embodiments of the disclosure, in which one of the receptacles is a fixed receptacle and the other is a movable receptacle.

Referring to FIG. 4A, receptacles 41 and 42 according to various embodiments are female-type connectors, and multiple receptacles 41 and 42 may be arranged on the side surface 15 of a main body (e.g., the main body 10 illustrated in FIG. 1). When two receptacles are arranged on the side surface 15, one receptacle, i.e., a first receptacle 41, may be arranged to be fixed, and the other receptacle, i.e., a second receptacle 42, may be configured to be movable.

According to an embodiment, the fixed first receptacle 41 is one component, and may be mounted on a printed circuit board. According to an embodiment, the movable second receptacle 42 may include a receptacle body 421 and a receptacle shell 422. The receptacle shell 422 may be slidably arranged in the receptacle body 421 in the third direction.

Figure 4B:
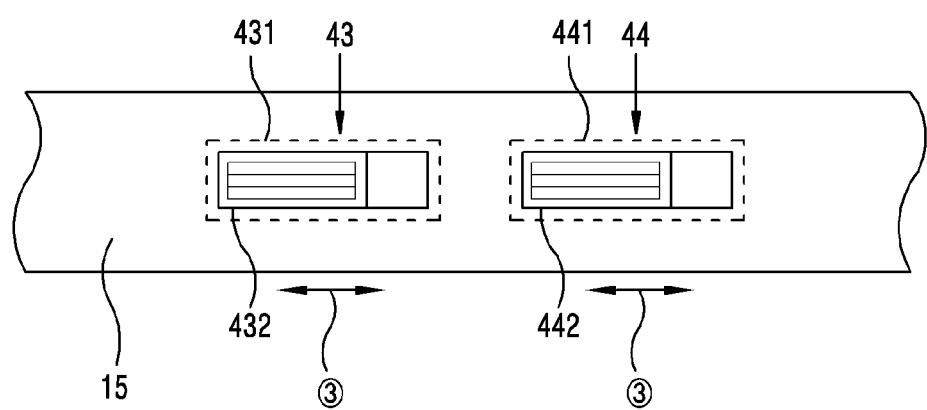
FIG. 4B is a front view illustrating an example of two receptacles arranged on the side surface of an electronic device in which movable receptacles are arranged side by side according to embodiments of the present disclosure.

FIG. 4B is a front view illustrating two receptacles arranged on the side surface of an electronic device according to various embodiments of the disclosure, in which movable receptacles are arranged side by side.

Referring to FIG. 4B, receptacles 43 and 44 according to various embodiments are female-type connectors, and multiple receptacles may be arranged on the side surface 15 of the main body. When two receptacles are arranged on the side surface 15, one receptacle, i.e., a first receptacle 43, may be arranged to be movable, and the other receptacle, i.e., a second receptacle 44, may also be configured to be movable.

According to an embodiment, the movable first receptacle 43 may include a receptacle body 441 and a receptacle shell 432. The receptacle shell 432 may be slidably arranged in the receptacle body 431 in the third direction. According to an embodiment, the movable second receptacle 44 may include a receptacle body 441 and a receptacle shell 442. The receptacle shell 442 may be slidably arranged in the receptacle body 441 in the third direction.

Figure 4C:
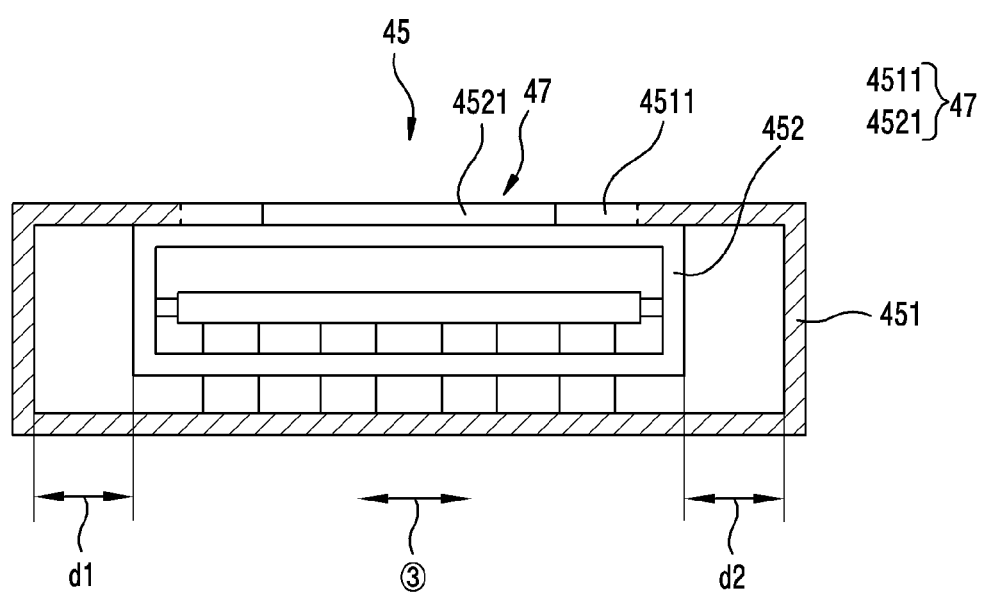
FIG. 4C is a front view illustrating an example receptacle arranged on the side surface of an electronic device according to embodiments of the present disclosure.

FIG. 4C is a front view illustrating a receptacle arranged on the side surface of an electronic device according to various embodiments of the disclosure.

Referring to FIG. 4C, the receptacle 45 according to various embodiments may include a guide device 47 of the receptacle shell 452. The sliding guide device 47 may include a combination of a guide rail 4521 and as guide opening 4511. The guide rail 4521 may be configured in the receptacle shell 452, and the guide opening 4511 may be configured in the receptacle body 451. However, there is no need to be limited to this structure, and the guide rail 4521 may be configured in the receptacle body 451, and the guide opening 4511 may be configured in the receptacle shell 452.

According to an embodiment, the receptacle shell 452 may move in the third direction ③ within the receptacle body 451 by the sliding guide device 47. For example, the receptacle shell 452 may move to one side by a first distance d1 in the inner space of the receptacle body 451 and to the other side by a second distance d2.

Figure 5A:
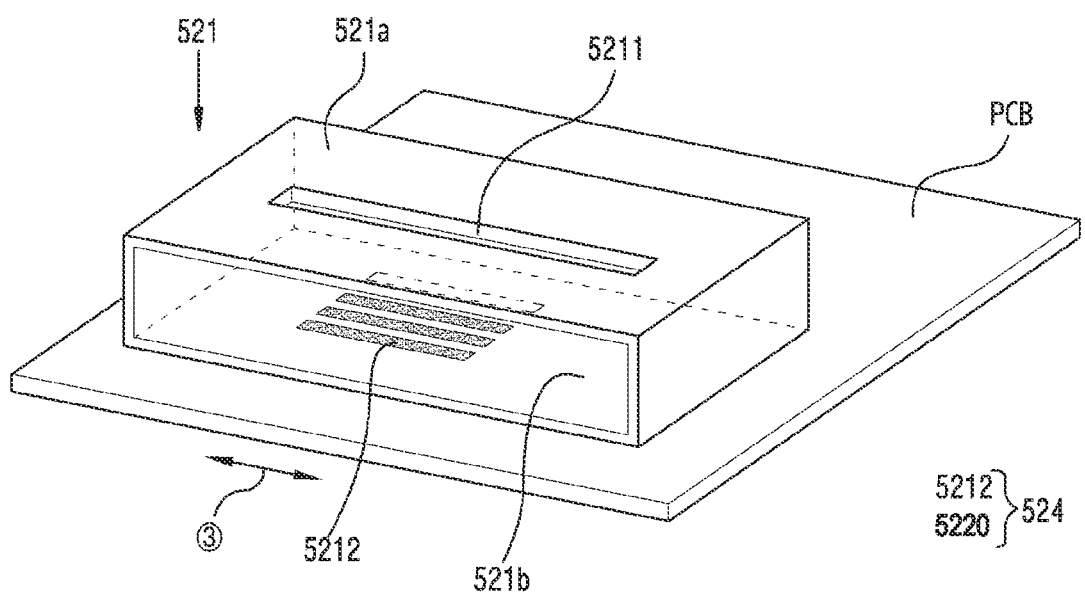
FIG. 5A is a perspective view illustrating an example receptacle body according to embodiments of the present disclosure.

FIG. 5A is a perspective view illustrating a receptacle body according to various embodiments of the disclosure.

Referring to FIG. 5A, a receptacle body 521 according to various embodiments may be mounted on a printed circuit board (PCB). The receptacle body 521 may have a box shape, in which the front and rear sides are open. A guide opening 5211 may be formed in the top surface 521a of the receptacle body 521. For example, the guide opening 5211 may be formed in a linear shape. According to an embodiment, the receptacle (e.g., the receptacle 45 illustrated in FIG. 4C) may include a connection structure 524 configured to electrically connect the receptacle body 521 and the receptacle shell (e.g., the receptacle shell 452 illustrated in FIG. 4C). According to an embodiment, the connection structure 524 may include a first connection part 5212 provided in the receptacle body 521 and a second connection part 5220 provided in the receptacle shell.

According to an embodiment, the first connection part 5212 may be disposed on the bottom surface 521b of the receptacle body 521. The first connection part 5212 may include multiple first connection terminals. Each of the first connection terminals may extend in the third direction ③. The guide opening 5211 and the first connection part 5212 may face each other.

Figure 5B:
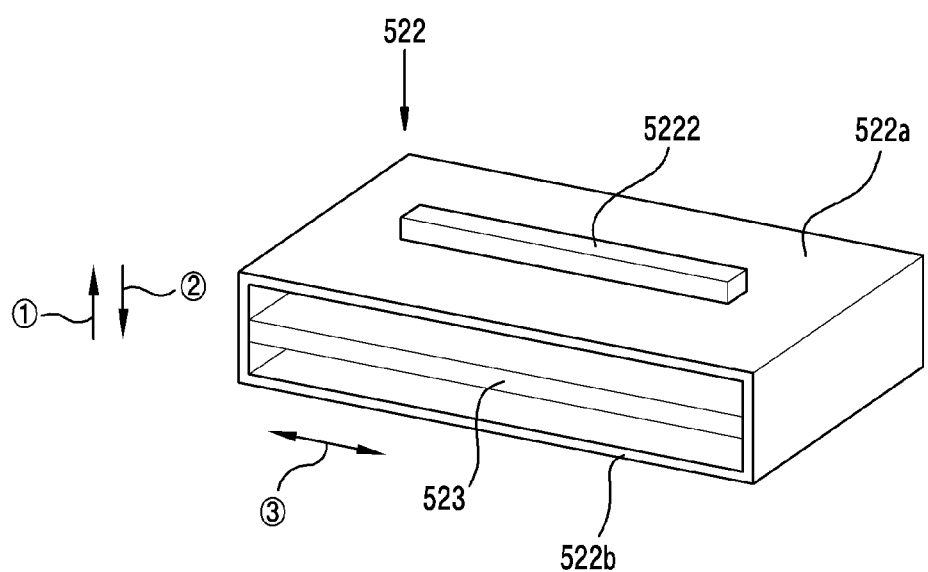
FIG. 5B is a perspective view illustrating an example receptacle shell according to embodiments of the present disclosure.

FIG. 5B is a perspective view illustrating a receptacle shell according to various embodiments of the disclosure.

Referring to FIG. 5B, a receptacle shell 522 according to various embodiments is a female-type connector into which an external connector is inserted, and may be configured in a box shape. The receptacle shell 522 may have a shape in which the front and rear sides are open and the top and bottom sides are closed.

According to an embodiment, a guide rail 5222 may be configured on the top surface 522a of the receptacle shell 522. The guide rail 5222 may protrude in the first direction ① and may extend in the third direction ③. According to an embodiment, the receptacle shell 522 may include a molded part 523. The molded part 523 may be coupled to the receptacle shell 522 so as to define the connection position of an external connector. The molded part 523 may be a support structure that can be fixed parallel to the inside of the receptacle shell 522. Reference numeral 522b denotes the bottom surface of the receptacle.

Figure 6:
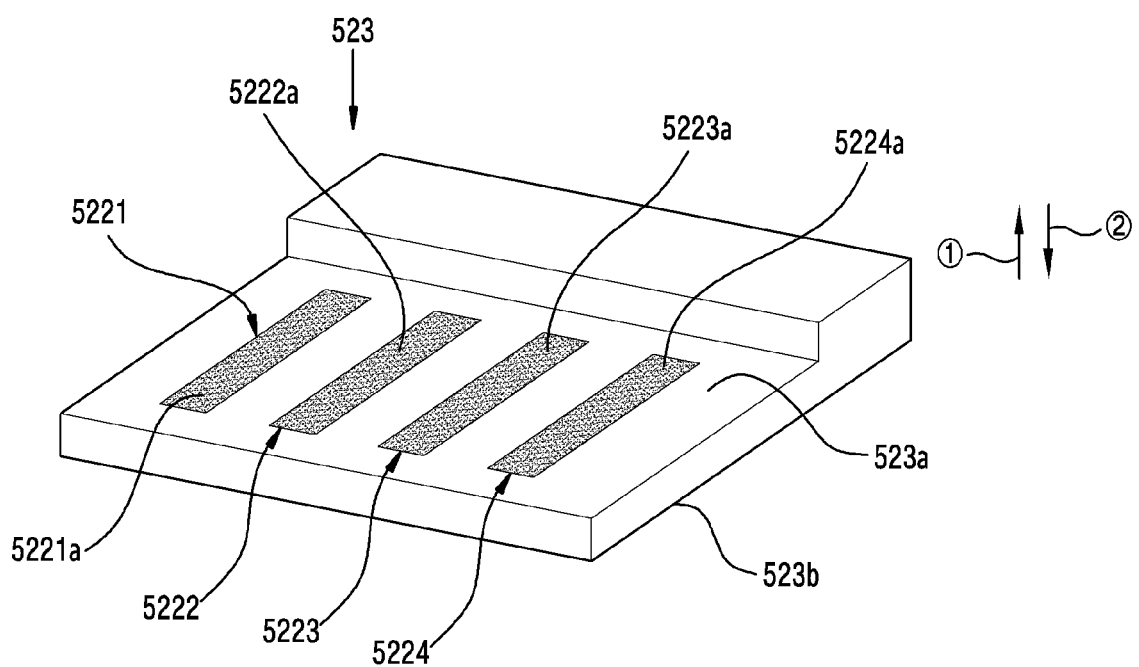
FIG. 6 is a perspective view illustrating an example molded part according to embodiments of the present disclosure.

FIG. 6 is a perspective view illustrating a molded part according to various embodiments of the disclosure.

Referring to FIG. 6, the molded part 523 coupled to the receptacle shell (e.g., the receptacle shell 522 illustrated in FIG. 5B) may define the connection position of an external connector, and the second connection part 5220 may be placed in the molded part 523. The molded part 523 may include a first surface 523 a oriented in a first direction {circle around (1)} and a second surface 523 b oriented in a second direction {circle around (2)} opposite to the first direction {circle around (1)}. For example, the second connection part 5220 may include one or more second connection terminals, for example, four second connection terminals.

According to an embodiment, a first portion 5221a of each second connection terminal connected to an external connector may be arranged on the first surface 523a of the molded part 523. For example, each of the second connection terminals may have approximately the same length. Each of the first portions 5221a may have a shape extending in a direction in which the external connector is connected.

Figure 7:
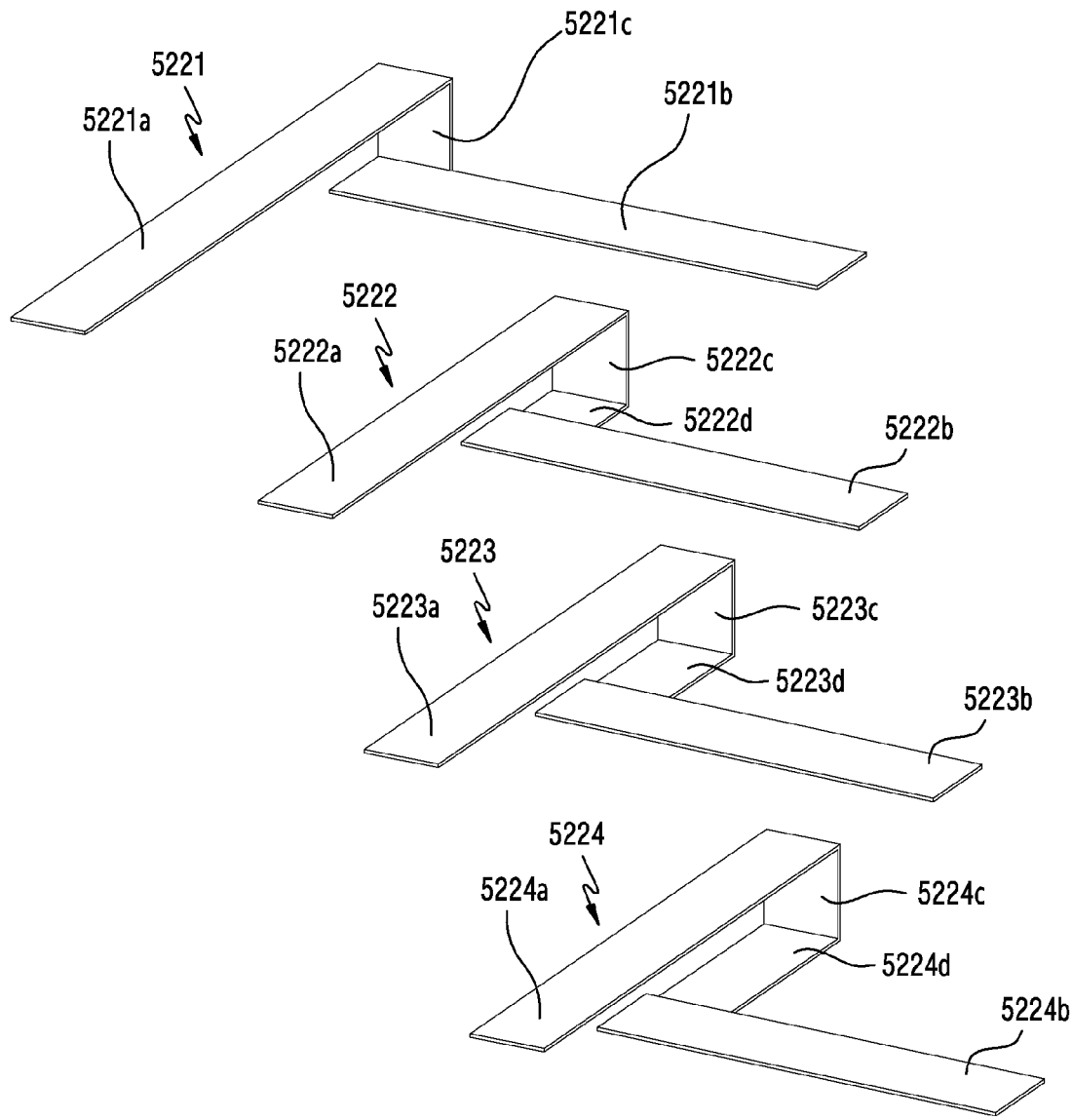
FIG. 7 is a perspective view illustrating example second terminals according to embodiments of the present disclosure.

FIG. 7 is a perspective view illustrating second terminals according to various embodiments of the disclosure.

Referring to FIG. 7, the second connection part 5220 may be arranged on a molded part (e.g., the molded part 523 illustrated in FIG. 6) according to various embodiments. The second connection part 5220 may include four connection terminals, for example, first to fourth connection terminals 5221-5224, and each of the first to fourth connection terminals 5221-5224 of the second connection part 5220 may have different shapes.

According to an embodiment, the first connection terminal 5221 of the second connection part may include first to third portions 5221a-5221c. According to an embodiment, the first portion 5221a may be arranged on the first surface of the molded part (e.g., the first surface 523a illustrated in FIG. 6) to extend in the direction in which an external connector is attached/detached. According to an embodiment, the second portion 5221b may be bent at least once in the first portion 5221a, and may be arranged in a shape extending in a third direction (e.g., the third direction ③ illustrated in FIG. 5A) toward the second surface (e.g., the second surface 523b illustrated in FIG. 6) of the molded part. The second portion 5221b may be a connection area that is connected to the first connection part (e.g., the first connection part 5212 illustrated in FIG. 5A), and may be a slidable surface contact part. According to an embodiment, the third portion 5221c may be a portion connecting the first and second portions 5221a and 5221b.

According to an embodiment, the second connection terminal 5222 of the second connection part may include first to fourth portions 5222a-5222d. According to an embodiment, the first portion 5222a may be arranged on the first surface of the molded part (e.g., the first surface 523a illustrated in FIG. 6) to extend in the direction in which an external connector is attached/detached. According to an embodiment, the second portion 5222b may be bent at least once in the first portion 5222a (e.g., bent about 90 degrees), and may be arranged in a shape extending in a third direction (e.g., the third direction ③ illustrated in FIG. 5A) toward the second surface (e.g., the second surface 523b illustrated in FIG. 6) of the molded part. The second portion 5222b may be a connection area that is connected to the first connection part (e.g., the first connection part 5212 illustrated in FIG. 5A), and may be a slidable surface contact part. According to an embodiment, the third and fourth portions 5222c and 5222d may be portions connecting the first and second portions 5222a and 5222b. The third portion 5222c may be bent in the first portion 5222a, and the fourth portion 5222d may be bent in the third portion 5222c.

According to an embodiment, the third connection terminal 5223 of the second connection part may include first to fourth portions 5223a-5223d. According to an embodiment, the first portion 5223a may be arranged on the first surface of the molded part (e.g., the first surface 523a illustrated in FIG. 6) to extend in the direction in which an external connector is attached/detached. According to an embodiment, the second portion 5223b may be bent at least once in the first portion 5223a (e.g., bent about 90 degrees), and may be arranged in a shape extending in a third direction (e.g., the third direction ③ illustrated in FIG. 5A) toward the second surface (e.g., the second surface 523b illustrated in FIG. 6) of the molded part. The second portion 5223b may be a connection area that is connected to the first connection part (e.g., the first connection part 5212 illustrated in FIG. 5A), and may be a slidable surface contact part. According to an embodiment, the third and fourth portions 5223c and 5223d may be portions connecting the first and second portions 5223a and 5223b. The third portion 5223c may be bent in the first portion 5222a, and the fourth portion 5223d may be bent in the third portion 5223c.

According to an embodiment, the fourth connection terminal 5224 of the second connection part may include first to fourth portions 5224a-5224d. According to an embodiment, the first portion 5224a may be arranged on the first surface of the molded part (e.g., the first surface 523a illustrated in FIG. 6) to extend in the direction in which an external connector is attached/detached. According to an embodiment, the second portion 5224b may be bent at least once in the first portion 5224a (e.g., bent about 90 degrees), and may be arranged in a shape extending in a third direction (e.g., the third direction ③ illustrated in FIG. 5A) toward the second surface (e.g., the second surface 523b illustrated in FIG. 6) of the molded part. The second portion 5224b may be a connection area that is connected to the first connection part (e.g., the first connection part 5212 illustrated in FIG. 5A), and may be a slidable surface-contact part. According to an embodiment, the third and fourth portions 5224c and 5224d may be portions connecting the first and second portions 5224a and 5224b. The third portion 5224c may be bent in the first portion 5222a, and the fourth portion 5224d may be bent in the third portion 5224c.

According to an embodiment, each of the first portions 5221a-5224a may have approximately the same length, and each of the second portions 5221b-5224b may have substantially the same length and be arranged in substantially the same direction.

According to an embodiment, in the structure of the second to fourth connection terminals 5222-5224, each of the third portions 5222c-5224c may have substantially the same length, and each of the fourth portions 5222d-5224d may have different lengths.

According to an embodiment, each of the first portions 5221a-5224a extends in the direction in which an external connector is attached/detached, and each of the second portions 5221b-5224b may extend in the third direction (e.g., the third direction ③ in FIG. 5A). According to an embodiment, in the structure of the second to fourth connection terminals 5222-5224, each of the third portions 5222c-5224c is arranged in the first direction (e.g., the first direction ① illustrated in FIG. 5B), and each of the fourth portions 5222d-5224d may extend in the direction in which an external connector is attached/detached.

Figure 8:
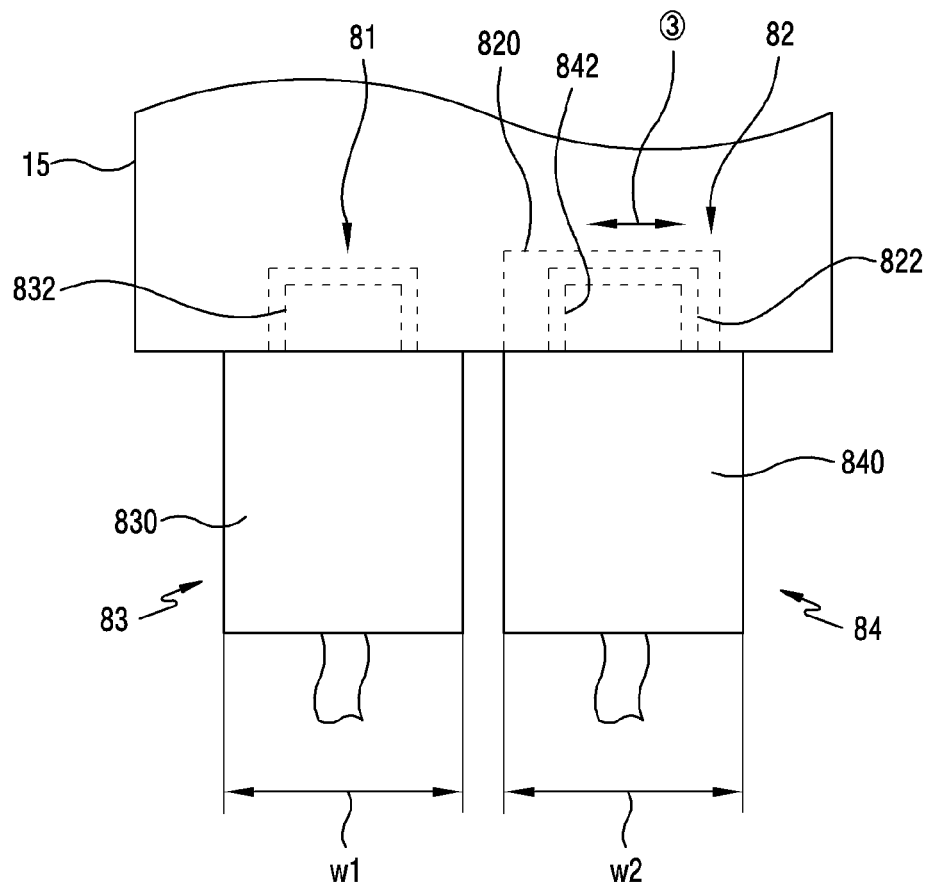
FIG. 8 is a plan view illustrating an example state in which first and second plugs are connected to first and second receptacles according to embodiments of the present disclosure.

FIG. 8 is a plan view illustrating the state in which first and second plugs are connected to first and second receptacles according to various embodiments of the disclosure.

Referring to FIG. 8, first and second receptacles 81 and 82 (e.g., the first and second receptacles 41 and 42 illustrated in FIG. 4A) arranged on the side surface 15 (e.g., the side surface 15 illustrated in FIG. 2) may be arranged to be spaced apart from each other. When connecting the first and second plugs 83 and 84 to respective first and second receptacles 81 and 82, it is possible to simultaneously connect first and second connection parts 832 and 842 of the first and second plugs 83 and 84 to the first and second receptacles 81 and 82 respectively, by sliding the receptacle shell 822 of the second receptacle 82 (e.g., the receptacle shell 522 illustrated in FIG. 5B) from the receptacle body 820 (e.g., the receptacle body 521 illustrated in FIG. 5A) in the third direction ③ (e.g., the third direction ③ illustrated in FIG. 2). When each of the first and second receptacles 81 and 82 is configured to be fixed, the simultaneous connection may not be possible due to the width w1 of the first plug body 830 and the width w2 of the second plug body 840. However, when any one of the first and second receptacles 81 and 82 is configured as a movable receptacle, regardless of the width of each of the first and second plug bodies 830 and 840, the simultaneous connection of the first and second plugs 83 and 84 may be possible.

Figure 9:
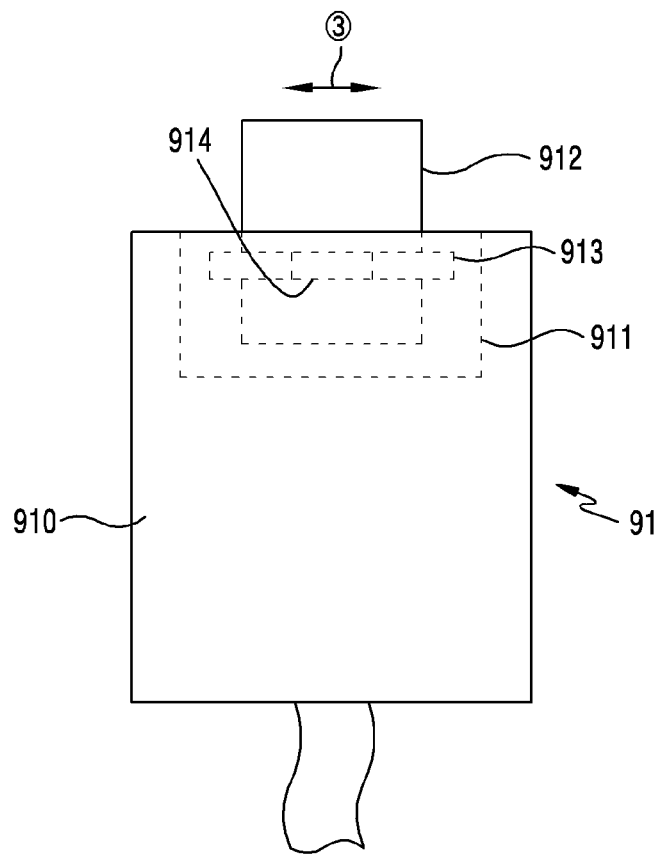
FIG. 9 is a plan view illustrating an example plug in which a connection part is configured to be movable according to embodiments of the present disclosure.

FIG. 9 is a plan view illustrating a plug in which a connection part is configured to be movable according to various embodiments of the disclosure.

Referring to FIG. 9, in a plug 91 (e.g., the second plug 84 illustrated in FIG. 8) connected to a receptacle according to various embodiments, a connection part 912 (e.g., the second connection part 842 illustrated in FIG. 8) may be configured to be movable. According to an embodiment, the plug 91 may include a plug body 910 and a connection part 912, which is movable in a third direction, i.e., the width direction of the plug body 910, in the plug body 910 by sliding guide devices 913 and 914 (e.g., the sliding guide device 47 illustrated in FIG. 4C). The connection part 912 may slide in the third direction (e.g., the third direction ③ illustrated in FIG. 2) in the plug body 910. For example, the sliding guide device may include a guide rail 914 (e.g., the guide rail 5222 illustrated in FIG. 5B) and a guide opening 913 (e.g., the guide opening 5211 illustrated in FIG. 5A). For example, the guide rail 914 may be configured in the connection part 912 or the plug body 910, and the guide opening 913 may be configured in the connection part 912 or the plug body 910.

Figure 10:
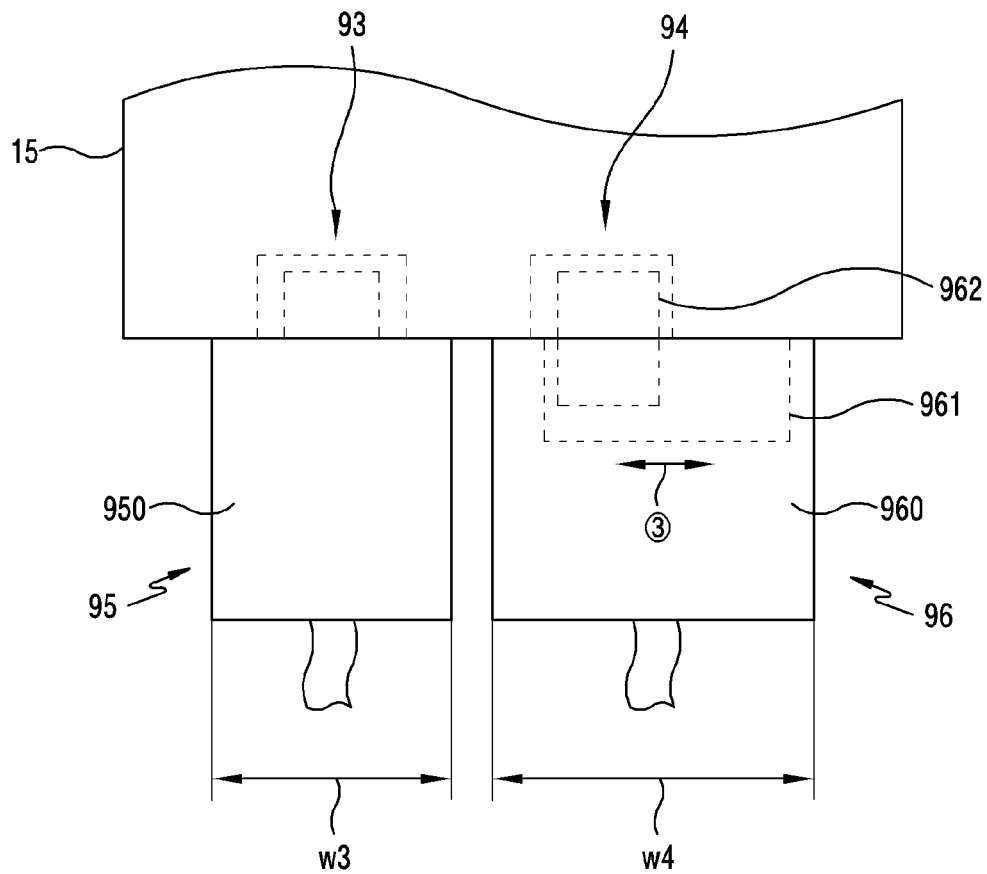
FIG. 10 is a plan view illustrating an example state in which first and second plugs are connected to first and second receptacles according to embodiments of the present disclosure.

FIG. 10 is a plan view illustrating the state in which first and second plugs are connected to first and second receptacles according to various embodiments of the disclosure.

Referring to FIG. 10, the first and second receptacles 93 and 94 arranged on the side surface 15 may be arranged to be spaced apart from each other. When connecting the first and second plugs 95 and 96 to the first and second receptacles 93 and 94, respectively, the first and second plugs 95 and 96 may be respectively connected to the first and second receptacles 93 and 94 by sliding the connection part 962 of the second plug 96 (e.g., the plug 91 illustrated in FIG. 9) in the third direction ③ (e.g., the third direction ③ illustrated in FIG. 2) in the shell 961 in the plug body 960. Even if each of the first and second receptacles 93 and 94 is fixedly arranged, when the connection part of any one of the first and second plugs 95 and 96 is configured to be movable, simultaneous connection of the first and second plugs 95 and 96 may be possible regardless of the widths w3 of the first body 950 and the width w4 of the second plug 960.

Figure 11A:
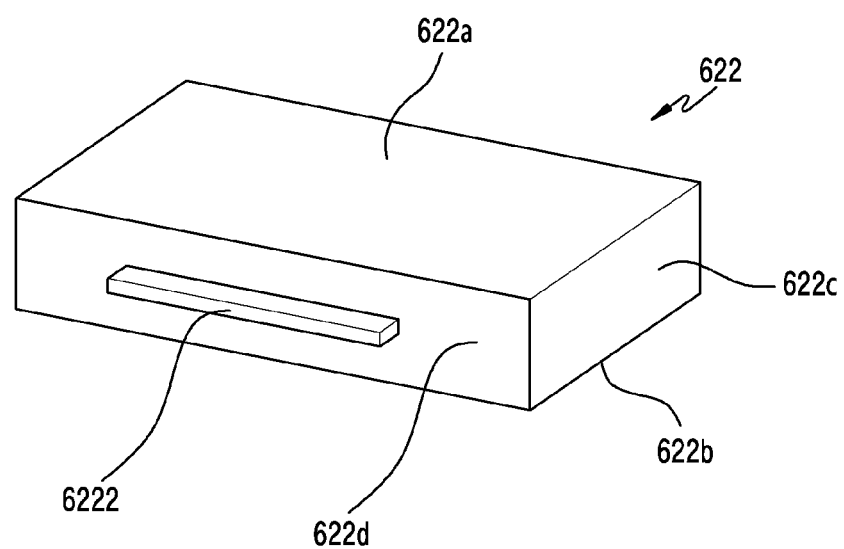
FIG. 11A is a perspective view illustrating an example receptacle shell according to embodiments of the present disclosure.
Figure 11B:
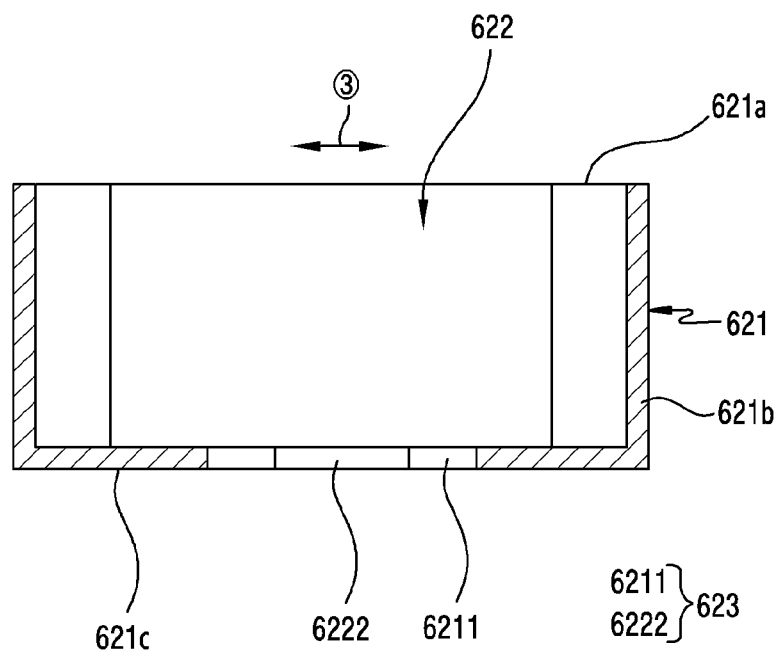
FIG. 11B is a cross-sectional view illustrating an example guide device according to embodiments of the present disclosure.

FIG. 11A is a perspective view illustrating a receptacle shell according to various embodiments of the disclosure, and FIG. 11B is a cross-sectional view illustrating a guide device according to various embodiments of the disclosure.

Referring to FIGS. 11A and 11B, a receptacle shell 622 according to various embodiments is a female-type connector into which an external connector is inserted, and may be configured in a box shape. The receptacle shell 622 may have a shape having an open front side, a closed lateral side, and closed top and bottom sides. For example, the receptacle shell 622 may include a top surface 622a, a bottom surface 622b, both side surfaces 622c, and a rear surface 622d.

According to an embodiment, a guide device 623 of the receptacle shell 622 may be arranged on the rear surface 622d side. A guide rail 6622 may be configured on the rear surface 622d of the receptacle shell. For example, the guide rail 6622 may be linear, and the guide rail 6622 may protrude from the rear surface 622d toward the rear side, and may extend in the third direction ③. According to an embodiment, the receptacle shell 622 may include a molded part (e.g., the molded part 523 illustrated in FIG. 5B). The molded part is coupled to the receptacle shell 622 so as to define the connection position of an external connector. According to an embodiment, the receptacle body 621 into which the receptacle shell 622 is inserted may have a guide opening 6211 into which the guide rail 6222 is inserted, and which is configured in the rear surface 621c thereof. The guide opening 6211 may be linear, and may have a length longer than the extension length of the guide protrusion 6222. Thus, limited sliding movement of the guide protrusion 6222 may be possible. The connection structure configured between the receptacle shell 622 and the receptacle body 621 may be configured in the same manner as the connection structure illustrated in FIGS. 6 and 7.

Figure 12A:
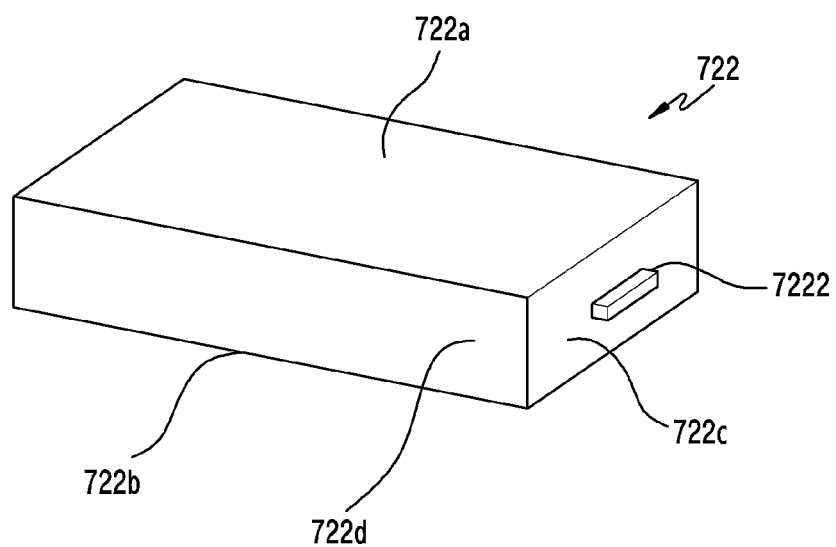
FIG. 12A is a perspective view illustrating an example receptacle shell according to embodiments of the present disclosure.
Figure 12B:
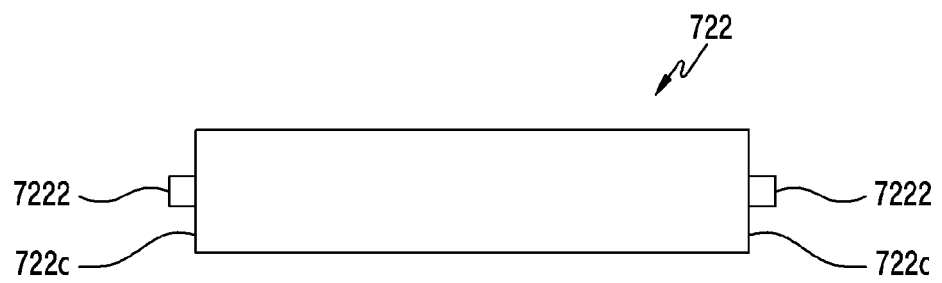
FIG. 12B is a front view illustrating an example receptacle shell according to embodiments of the present disclosure.
Figure 12C:
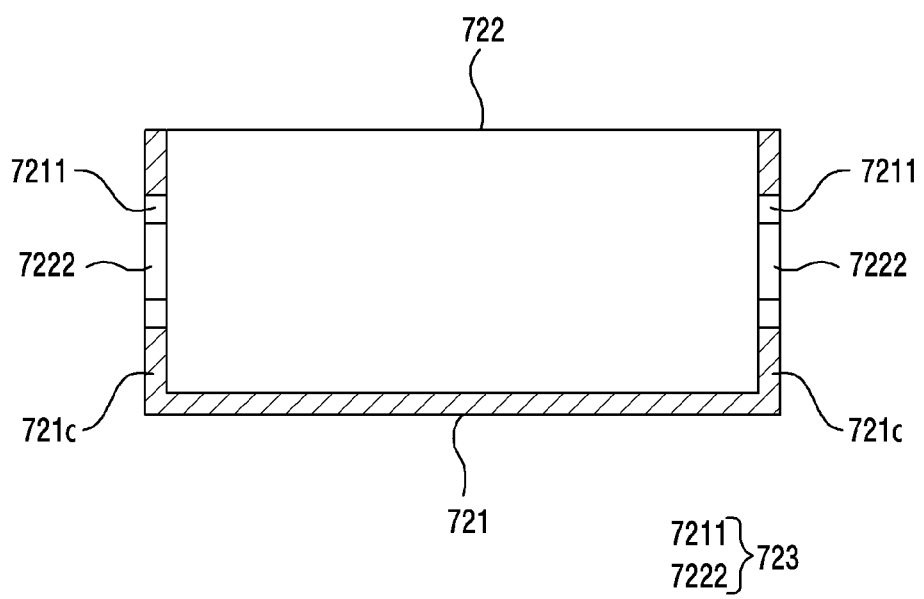
FIG. 12C is a cross-sectional view illustrating an example guide device according to embodiments of the present disclosure.

FIG. 12A is a perspective view illustrating a receptacle shell according to various embodiments of the disclosure, FIG. 12B is a front view illustrating the receptacle shell according to various embodiments of the disclosure, and FIG. 12C is a cross-sectional view illustrating a guide device according to various embodiments of the disclosure.

Referring to FIGS. 12A to 12C, a receptacle shell 722 according to various embodiments is a female-type connector into which an external connector is inserted, and may be configured in a box shape. The receptacle shell 722 may have a shape having an open front side, a closed lateral side, and closed top and bottom sides. For example, the receptacle shell 722 may include a top surface 722a, a bottom surface 722b, both side surfaces 722c, and a rear surface 722d.

According to an embodiment, guide devices 723 of the receptacle shell 722 may be arranged on both side surfaces 722c sides, respectively. Guide rails 7222 may be configured on both side surfaces 722c of the receptacle shell, respectively. For example, each guide rail 7222 may be linear, and may protrude laterally from the corresponding side surface 722c. According to an embodiment, the receptacle shell 722 may include a molded part (e.g., the molded part 523 illustrated in FIG. 5B). The molded part is coupled to the receptacle shell 722 so as to define the connection position of an external connector. According to an embodiment, the receptacle body 721 into which the receptacle shell 722 is inserted may have guide openings 7211 into which the guide rails 7222 are inserted, respectively, and which are configured in both side surfaces 721c thereof, respectively. The guide opening 7211 may be linear, and may have a length longer than the extension length of the guide protrusion 7222. Thus, limited sliding movement of the guide protrusion 7222 may be possible.

Various embodiments disclosed in this specification and the drawings are provided merely to represent specific examples for the purpose of easily describing the technical contents of the disclosure and helping the understanding of the disclosure, and are not intended to limit the scope of the disclosure. Accordingly, the scope of the disclosure should be construed in such a manner that, in addition to the embodiments disclosed herein, all changes or modifications derived from the technical idea of the disclosure are included in the scope of the disclosure.

The invention claimed is:

1. An electronic device comprising:
a receptacle body;
a receptacle shell configured to be capable of sliding, without extending from or receding within a main body of the electronic device, in the receptacle body in a direction perpendicular to a direction in which an external connector is attached/detached;
a guide opening extending in the sliding direction in the receptacle body;
a guide rail extending in the sliding direction in the receptacle shell, and configured to move in the guide opening;
a molded object coupled to the receptacle shell to define a connection position of the external connector; and
a connection structure configured to electrically connect the receptacle shell and the receptacle body to each other, and
wherein the guide rail protrudes from a first surface of the receptacle shell in a first direction and is configured to enable limited sliding movement as linear.

2. The electronic device of claim 1, wherein the connection structure comprises:
a first connection part comprising multiple first connection terminals arranged in the receptacle shell and extending in the sliding direction; and
a second connection part comprising multiple second connection terminals and arranged on the molded object to maintain a state of being electrically connected to first connection part.

3. The electronic device of claim 2, wherein the first connection terminals are arranged at a position facing the guide opening.

4. The electronic device of claim 2, wherein each of the second connection terminals comprises:
a first portion arranged on a first surface of the molded object oriented in the first direction;
a second portion bent at least once in the first portion and arranged toward a second surface of the molded object oriented in a second direction, the second portion being connected to the second connection terminal; and
at least one third portion connected to the first portion and electrically connected to the second portion.

5. An electronic device comprising:
a main body comprising a first plate oriented in a first direction, a second plate oriented in a second direction opposite to the first direction, and at least one printed circuit board; and
at least one receptacle arranged in the main body to be connected with an external connector,
wherein the receptacle comprises:
a receptacle body connected to the printed circuit board;
a receptacle shell to which the external connector is connected, the receptacle shell being configured to be capable of sliding, without extending from or receding within the main body of the electronic device, in a third direction perpendicular to a direction in which an external connector is attached/detached and perpendicular to each of the first and second directions;
a guide device configured to guide sliding movement of the receptacle shell;
a molded object coupled to the receptacle shell to define a connection position of the external connector; and
a connection structure configured to electrically connect the receptacle shell and the receptacle body to each other, wherein the guide device includes a guide rail protruding from a first surface of the receptacle shell in the first direction and configured to enable limited sliding movement as linear.

6. The electronic device of claim 5, wherein the receptacle shell performs linear sliding movement.

7. The electronic device of claim 5, wherein the external connector comprises an HDMI connector.

8. The electronic device of claim 5, further comprising a side surface, wherein the third direction is perpendicular to a direction in which the side surface extends.

9. The electronic device of claim 5, wherein the guide device comprises:
   a guide opening extending in the third direction in the receptacle body; and
   the guide rail extending in the third direction in the receptacle body to be inserted into the guide opening.

10. The electronic device of claim 9, wherein the guide opening has a length longer than a length of the guide rail so as to allow limited movement of the guide rail within the guide opening.

11. The electronic device of claim 9, wherein the connection structure comprises:
   a first connection part comprising multiple first connection terminals arranged in the receptacle and extending in the sliding direction; and
   a second connection part comprising multiple second connection terminals and arranged on the molded object to maintain a state of being electrically connected to first connection part.

12. The electronic device of claim 11, wherein the first connection terminals are arranged at a position facing the guide opening.

13. The electronic device of claim 11, wherein each of the second connection terminals comprises:
   a first portion arranged on a first surface of the molded object oriented in the first direction;
   a second portion bent at least once in the first portion and arranged toward a second surface of the molded object oriented in the second direction, the second portion being connected to the second connection terminal; and
   at least one third portion connected to the first portion and electrically connected to the second portion.

14. The electronic device of claim 13, wherein each of the first portions has a substantially same length, and each of the second portions has a substantially same length.

15. The electronic device of claim 13, wherein the first portion extends in a direction in which an external connector is attached/detached, the second portion extends in the third direction, and the third portion extends in a direction perpendicular to the first and second portions.

* * * * *